United States Patent
Burchall et al.

(10) Patent No.: US 10,872,076 B2
(45) Date of Patent: Dec. 22, 2020

(54) TRANSACTION ORDERING

(71) Applicant: Amazon Technologies, Inc., Seattle, WA (US)

(72) Inventors: Laurion Darrell Burchall, Seattle, WA (US); Pradeep Jnana Madhavarapu, Mountain View, CA (US); Christopher Richard Newcombe, Kirkland, WA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 333 days.

(21) Appl. No.: 15/701,343

(22) Filed: Sep. 11, 2017

(65) Prior Publication Data

US 2018/0004801 A1 Jan. 4, 2018

Related U.S. Application Data

(63) Continuation of application No. 13/893,004, filed on May 13, 2013, now Pat. No. 9,760,596.

(51) Int. Cl.
*G06F 16/30* (2019.01)
*G06F 16/23* (2019.01)
*G06F 9/46* (2006.01)

(52) U.S. Cl.
CPC .......... *G06F 16/2379* (2019.01); *G06F 9/466* (2013.01); *G06F 16/2315* (2019.01); *G06F 16/2336* (2019.01); *G06F 16/2365* (2019.01)

(58) Field of Classification Search
CPC ............. G06F 16/2315; G06F 16/2336; G06F 16/2365; G06F 16/2379; G06F 9/466
See application file for complete search history.

(56) References Cited

U.S. PATENT DOCUMENTS

| 4,933,901 A | * | 6/1990 | Tai | ............................ | G06F 5/14 365/189.07 |
| 5,280,612 A | | 1/1994 | Lorie et al. | | |

(Continued)

FOREIGN PATENT DOCUMENTS

| CA | 2783370 | 7/2011 |
| EP | 0675451 | 10/1995 |

(Continued)

OTHER PUBLICATIONS

Article entitled "Detection of Transactional Memory Anomalies using Static Analysis", by Teixeira et al., Copyright 2010.*

(Continued)

*Primary Examiner* — Mahesh H Dwivedi
(74) *Attorney, Agent, or Firm* — Robert C. Kowert; Kowert, Hood, Munyon, Rankin & Goetzel, P.C.

(57) ABSTRACT

Nodes of a database service may receive a read request to perform a read of a record stored by the database service and a transaction request to perform a transaction to the record. First and second indications of time may be associated with the read and transaction, respectively. A potential read anomaly (e.g., fuzzy read, read skew, etc.) may be detected based, at least in part, on a determination that the first indication of time is within a threshold value of the second indication of time. In response to detecting the potential read anomaly, the read may be performed after the transaction specified by the transaction request, regardless of whether the first indication of time is indicative of an earlier point in time than the second indication of time.

17 Claims, 8 Drawing Sheets

(56) References Cited

U.S. PATENT DOCUMENTS

| | | | |
|---|---|---|---|
| 5,452,445 A * | 9/1995 | Hallmark | G06F 16/2379 |
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 6,041,423 A | 3/2000 | Tsukerman | |
| 6,112,319 A * | 8/2000 | Paulson | G06F 11/073 710/54 |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,124 B1 | 5/2004 | Koseki et al. | |
| 6,732,171 B2 | 5/2004 | Hayden | |
| 6,792,518 B2 | 9/2004 | Armangau et al. | |
| 6,832,229 B2 | 12/2004 | Reed | |
| 6,957,236 B1 * | 10/2005 | Ganesh | G06F 9/466 |
| 6,970,872 B1 | 11/2005 | Chandrasekaran et al. | |
| 6,976,022 B2 | 12/2005 | Vemuri et al. | |
| 7,010,645 B2 | 3/2006 | Hetzler et al. | |
| 7,047,322 B1 * | 5/2006 | Bauman | G06F 12/0835 710/33 |
| 7,089,253 B2 | 8/2006 | Hinshaw et al. | |
| 7,146,386 B2 | 12/2006 | Xiao | |
| 7,287,034 B2 | 10/2007 | Wong et al. | |
| 7,305,386 B2 | 12/2007 | Hinshaw et al. | |
| 7,308,456 B2 | 12/2007 | Friske et al. | |
| 7,328,226 B1 | 2/2008 | Karr et al. | |
| 7,340,577 B1 | 3/2008 | Van Dyke et al. | |
| 7,707,219 B1 | 4/2010 | Bruso et al. | |
| 7,716,645 B2 | 5/2010 | Dolby et al. | |
| 7,747,663 B2 | 6/2010 | Atkin et al. | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,086,650 B1 | 12/2011 | Milford | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,463,825 B1 | 6/2013 | Harty et al. | |
| 8,965,861 B1 * | 2/2015 | Shalla | G06F 9/546 707/703 |
| 9,032,165 B1 * | 5/2015 | Brooker | G06F 12/0806 711/154 |
| 9,596,294 B2 * | 3/2017 | Kanthak | H04L 67/10 |
| 9,760,596 B2 | 9/2017 | Burchall et al. | |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0213387 A1 * | 10/2004 | Chandrasekaran | G06F 16/2322 379/93.24 |
| 2004/0225696 A1 | 11/2004 | Wong et al. | |
| 2004/0249838 A1 * | 12/2004 | Hinshaw | G06F 16/2329 |
| 2004/0249869 A1 | 12/2004 | Oksanen | |
| 2005/0015416 A1 | 1/2005 | Yamagami | |
| 2005/0066095 A1 | 3/2005 | Mullick et al. | |
| 2006/0020634 A1 | 1/2006 | Huras et al. | |
| 2006/0047626 A1 | 3/2006 | Raheem | |
| 2006/0112222 A1 | 5/2006 | Barrall | |
| 2006/0224636 A1 | 10/2006 | Kathuria et al. | |
| 2006/0259568 A1 * | 11/2006 | Jagathesan | G06F 13/28 709/213 |
| 2006/0282476 A1 * | 12/2006 | Dolby | G06F 8/458 |
| 2007/0083570 A1 | 4/2007 | Fineberg | |
| 2007/0130238 A1 | 6/2007 | Harris et al. | |
| 2008/0010322 A1 | 1/2008 | Lee et al. | |
| 2008/0183973 A1 | 7/2008 | Aguilera et al. | |
| 2008/0294648 A1 | 11/2008 | Lin et al. | |
| 2008/0320262 A1 | 12/2008 | McKenney et al. | |
| 2009/0228511 A1 | 9/2009 | Atkin et al. | |
| 2009/0249001 A1 | 10/2009 | Narayanan et al. | |
| 2010/0036861 A1 | 2/2010 | Srihari et al. | |
| 2010/0050172 A1 | 2/2010 | Ferris | |
| 2010/0106753 A1 * | 4/2010 | Prabhakaran | G06F 3/065 707/818 |
| 2010/0192131 A1 | 7/2010 | Dolby et al. | |
| 2011/0016279 A1 | 1/2011 | Gillingham | |
| 2011/0035548 A1 | 2/2011 | Kimmel et al. | |
| 2011/0060724 A1 | 3/2011 | Chan | |
| 2011/0072217 A1 | 3/2011 | Hoang et al. | |
| 2011/0161496 A1 | 6/2011 | Nicklin | |
| 2011/0178984 A1 | 7/2011 | Talius et al. | |
| 2011/0208793 A1 * | 8/2011 | Grossfeld | G06F 9/505 707/826 |
| 2011/0251997 A1 | 10/2011 | Wang et al. | |
| 2012/0005196 A1 | 1/2012 | Horii | |
| 2012/0011106 A1 | 1/2012 | Reid et al. | |
| 2012/0041899 A1 | 2/2012 | Greene et al. | |
| 2012/0042152 A1 | 2/2012 | Dubrovin et al. | |
| 2012/0174112 A1 | 7/2012 | Vaidya et al. | |
| 2012/0191648 A1 | 7/2012 | Kuber et al. | |
| 2012/0246483 A1 * | 9/2012 | Raisch | H04L 9/3297 713/178 |
| 2012/0259889 A1 | 10/2012 | Dinker et al. | |
| 2012/0297073 A1 | 11/2012 | Glover et al. | |
| 2012/0303581 A1 | 11/2012 | Calder et al. | |
| 2012/0310985 A1 | 12/2012 | Gale et al. | |
| 2012/0310986 A1 | 12/2012 | Frantz et al. | |
| 2012/0310991 A1 | 12/2012 | Frantz et al. | |
| 2012/0323849 A1 | 12/2012 | Garin, Jr. et al. | |
| 2013/0036281 A1 | 2/2013 | Revah et al. | |
| 2013/0042056 A1 | 2/2013 | Shats et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2013/0318146 A1 * | 11/2013 | Kanthak | G06F 9/466 709/201 |
| 2014/0324785 A1 | 10/2014 | Gupta et al. | |

FOREIGN PATENT DOCUMENTS

| | | |
|---|---|---|
| EP | 1630674 | 3/2006 |
| JP | H10-254748 | 9/1998 |
| JP | 2000057032 | 2/2000 |
| JP | 2000259474 | 9/2000 |
| JP | 2005050024 | 2/2005 |
| JP | 2005276094 | 10/2005 |
| JP | 2006263581 | 10/2006 |
| JP | 2007200182 | 8/2007 |
| JP | 2007206759 | 8/2007 |
| JP | 2007317017 | 12/2007 |
| JP | 2008003932 | 1/2008 |
| JP | 2012014502 | 1/2012 |
| JP | 2012507072 | 3/2012 |

OTHER PUBLICATIONS

Article entitled "An Efficient Cache-Based Access Anomaly Detection Scheme", by Min et al., Copyright 1991.*

Office Action from Chinese Application No. 201480039678.9, (Amazon Technologies Inc.), dated Nov. 14, 2018, pp. 1-23.

Toby Segaran et al., "Beautiful Data", published in Oct. 2010 (no English translation), pp. 1-5.

(56) References Cited

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.
"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL -Query-Result-Set-Caching.htm, pp. 1-7.
"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11g Release 2 (11.2)" Sep. 2011, pp. 1-460.
"Isolation (database systems)" downloaded from http://en.wikipedia.org/wiki/lsolation_(database_systems) on May 15, 2013, pp. 1-7.
U.S. Appl. No. 13/892,027, filed May 10, 2013, Anurag Windlass Gupta.
U.S. Appl. No. 13/873,467, filed Apr. 20, 2013, Anurag Windlass Gupta.
U.S. Appl. No. 13/902,381, filed May 24, 2013, Anurag Windlass Gupta.
U.S. Appl. No. 13/901,111, filed May 23, 2013, Anurag Windlass Gupta.
U.S. Appl. No. 13/894,969, filed May 25, 2013, Grant Alexander MacDonald McAlister.
U.S. Appl. No. 13/903,674, filed May 28, 2013, Anurag Windlass Gupta.
International Search Report and Written Opinion from PCT/US14/37901, dated Oct. 3, 2014, Amazon Technologies, Inc., pp. 1-11.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
Extended European Search Report from PCT/US2014/037901, dated Jan. 19, 2017, Amazon Technologies, Inc., pp. 1-11.
Hector Garcia-Molina, et al., "Database Systems—The Complete Book Second Edition—Chapter 18—Concurrency Control", In: "Database systems the complete book, Second Edition", Jun. 15, 2005, pp. 883-951.
M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.
Atul Adya, et al., "Efficient Optimistic Concurrency Control Using Loosely Synchronized Clocks", SIGMOD Record, ACM, vol. 24, No. 2, May 22, 1995, pp. 23-34.
Jim Gray, et al., "Transaction Processing: Concepts and Techniques—Chapter 10", In: "The Morgan Kaufmann Series in data management systems", Jan. 1, 1993, pp. 529-582.
Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
Office Action from Japanese Patent Application No. 2016-514043, dated Feb. 28, 2017 (English translation and Japanese version), pp. 1-5.
Sailesh Chutani et al "The Episode File System", In Proceedings of the USENIX Winter 1992 Technical Conference, Jan. 20, 1992, pp. 43-60.
"Oracle TimesTen In-Memory Database Architectural Overview Release 6.0", Dated Jan. 1, 2006, Retrieved from the Internet: URL:http://downlaod.oracle.com/otn_hosted_doc/timesten/603/TimesTen-Documentation/arch.pdf, pp. 1-122.
Jim Gray et al, "Transaction Processing: Concepts and Techniques—Chapter 10", dated Jan. 1, 1993, pp. 529-561.
Office Action from European Application No. 14797058.6-1222, dated Jun. 12, 2019, pp. 1-13.
William E. Weihl, Distributed Version Management for Read-only Actions), IEEE Transactions on Software Engineering vol. SE-13, No., Dated Jan. 1987, pp. 1-10.

* cited by examiner

TRANSACTION ORDERING

This application is a continuation of U.S. patent application Ser. No. 13/893,004, filed May 13, 2013, now U.S. Pat. No. 9,760,596, which is hereby incorporated by reference herein in its entirety.

BACKGROUND

Distribution of various components of a software stack can in some cases provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can be difficult to distribute databases while still ensuring the so-called ACID properties (e.g., Atomicity, Consistency, Isolation, and Durability) that they are expected to provide. Specifically regarding the Consistency and Isolation properties, coordinating between nodes of a distributed database system to preserve causality across the nodes has proven very difficult for prior systems.

Figure 1:
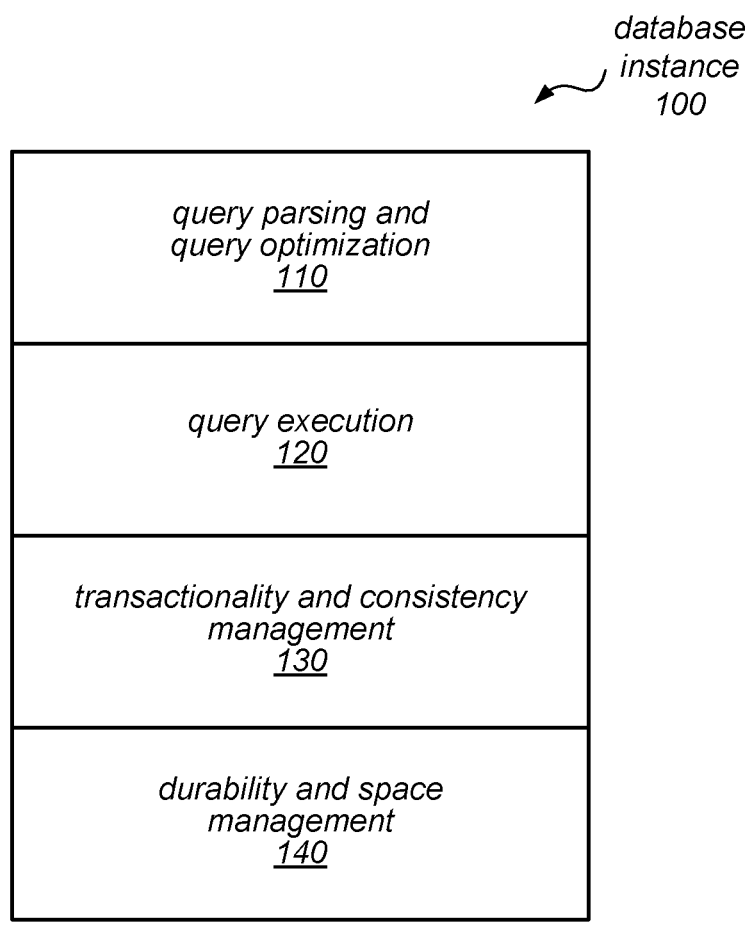
FIG. 1 is a block diagram illustrating various components of a database software stack, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of transaction ordering are disclosed. Various ones of the present embodiments may include nodes (e.g., of a database service) receiving a read request to perform a read of a stored record and a transaction request to perform a transaction (e.g., write, etc.) to the record. Various ones of the present embodiments may also include the nodes associating first and second indications of time with the read and transaction, respectively. Various ones of the present embodiments may further include detecting a potential read anomaly (e.g., fuzzy read, read skew, etc.) based, at least in part, on a determination that the first indication of time is within a threshold value of the second indication of time. Note that, in some embodiments, detection may also be based on indications of time other than the first and second indications of time. In response to detecting the potential read anomaly, the read may be performed after the transaction specified by the transaction request, regardless of whether the first indication of time is indicative of an earlier point in time than the second indication of time. In some instances, the read may be retried such that a potential read anomaly does not occur for the retry.

The specification first describes an example web services-based database service configured to implement the disclosed transaction ordering techniques. Included in the description of the example web services-based database service are various aspects of the example web services-based database service, such as a database engine and a separate distributed database storage service (note that, in some embodiments, the storage service may not be separate from the database engine). The specification then describes flowcharts of various embodiments of methods for transaction ordering. Next, the specification describes an example system that may implement the disclosed techniques. Various examples are provided throughout the specification. Note that the disclosed transaction ordering techniques may be used in systems other than the example database service of FIGS. 1-5, such as other systems that are usable to read, write, and store data. For example, the disclosed techniques may be used in any system in which the following may occur: a read of data and a sequence of updates to the data with a point in time at which those updates are made visible to the read.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems). As noted herein, the described transaction ordering techniques may apply equally in other systems as well.

As described in more detail herein, in some embodiments, some of the lowest level operations of a database, (e.g., backup, restore, recovery, log record manipulation, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, network traffic between the database tier and the storage layer may be greatly reduced compared to network traffic in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that same piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, traditional attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, the third tier may implement the disclosed transaction ordering techniques. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Turning now to the figures, FIG. 1 is a block diagram illustrating various components of a database software stack, according to one embodiment. As illustrated in this example, a database instance may include multiple functional components (or layers), each of which provides a portion of the functionality of the database instance. In this example, database instance 100 includes a query parsing and query optimization layer (shown as 110), a query execution layer (shown as 120), a transactionality and consistency management layer (shown as 130), and a durability and space management layer (shown as 140). As noted above, in some existing database systems, scaling a database instance may involve duplicating the entire database instance one or more times (including all of the layers illustrated in FIG. 1), and then adding glue logic to stitch them together. In some embodiments, the systems described herein may instead offload the functionality of durability and space management layer 140 from the database tier to a separate storage layer, and may distribute that functionality across multiple storage nodes in the storage layer. Note that the disclosed transaction ordering techniques may also apply in embodiments in which the durability and space management layer 140 is part of the database tier.

In various embodiments, the database systems described herein may support a standard or custom application programming interface (API) for a variety of database operations/transactions. For example, the API may support operations for creating a database, creating a table, altering a table, creating a user, dropping a user, inserting one or more rows in a table, copying values, selecting data from within a table (e.g., querying a table), canceling or aborting a query, and/or other operations.

In some embodiments, the database tier of a database instance may include a database engine head node server (which may also be referred to as a primary node) that receives read and/or write requests (and/or other transaction requests) from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system. In some embodiments, as described in more detail below, the database engine head node may be configured to perform transaction ordering, which may help preserve a particular isolation level (e.g., read consistent, etc.).

In some embodiments, the database tier (or more specifically, the database engine head node) may include a cache in which recently accessed data pages are held temporarily. In such embodiments, if a write request is received that targets a data page in such a cache, in addition to shipping a corresponding redo log record to the storage layer, the database engine may apply the change to the copy in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage. Also note, though, that multiple database instances, each with a database engine head node, may exist.

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

Figure 7A:
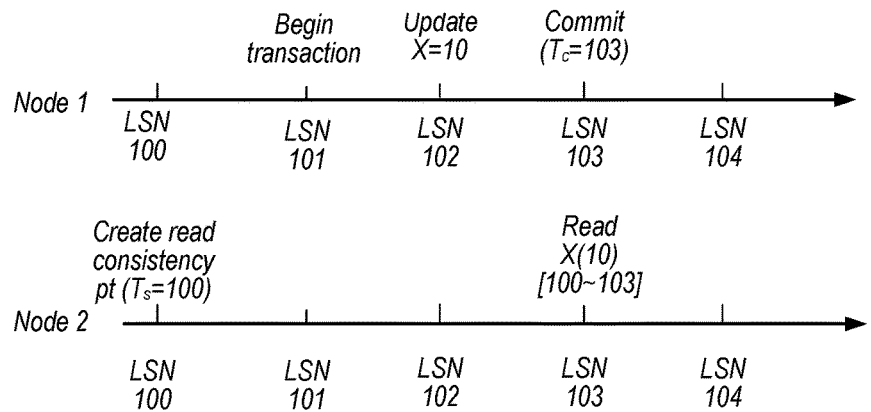
FIGS. 7A-C are timing diagrams illustrating various transaction ordering scenarios according to various embodiments.
Figure 7B:
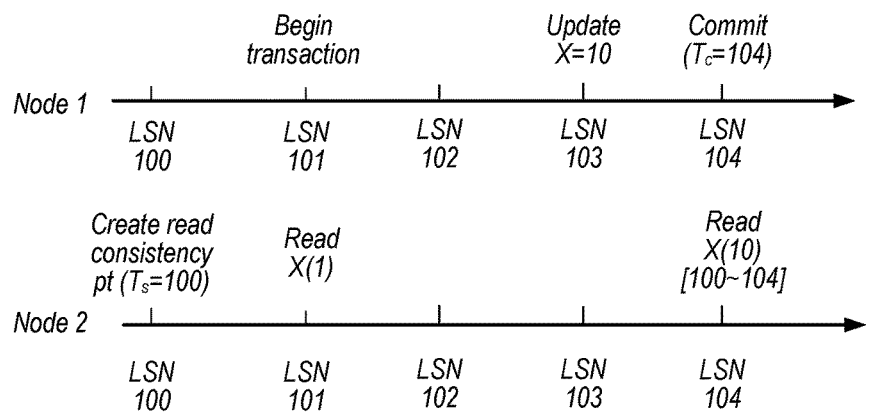
Figure 7C:
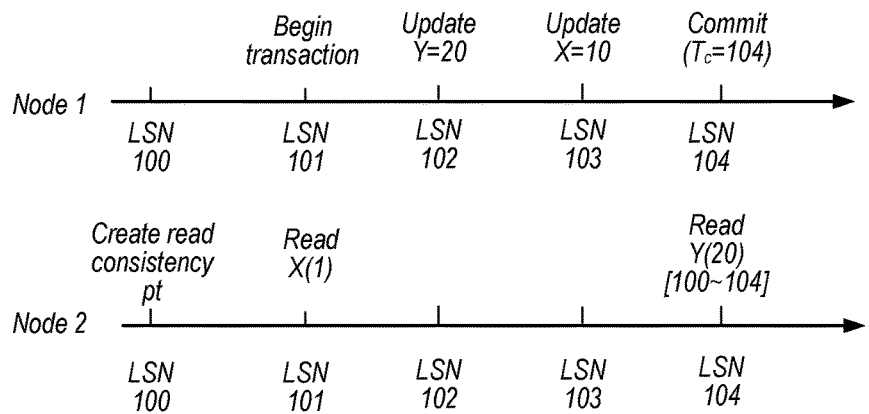

In some embodiments, the client side driver may perform the disclosed transaction ordering, for a database engine head node that receives a read request to retrieve multiple records, as described herein. For example, a database engine head node of the database service may receive a read request to perform a read of a record stored by the database service. Another database engine head node may receive a transaction request to perform a transaction (e.g., write, etc.) to the record. The database engine head node that received the read request may detect a potential read anomaly (e.g., fuzzy read, read skew, etc.) based on a determination that an indication of time associated with the read is within a threshold value of a second indication of time associated with the transaction. In response to detecting the potential read anomaly, the read may be performed after the transaction specified by the transaction request, regardless of whether the first indication of time is indicative of an earlier point in time than the second indication of time. In some instances, the read may be retried such that a potential read anomaly does not occur for the retry. Note that a database engine head node may, at one time, receive a read request to query a data table, and at another time, receive a transaction request to modify a data table. Various example timing diagrams of a normal read, a fuzzy read, and a read skew are illustrated at FIGS. 7A-C, as described below.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

Figure 2:
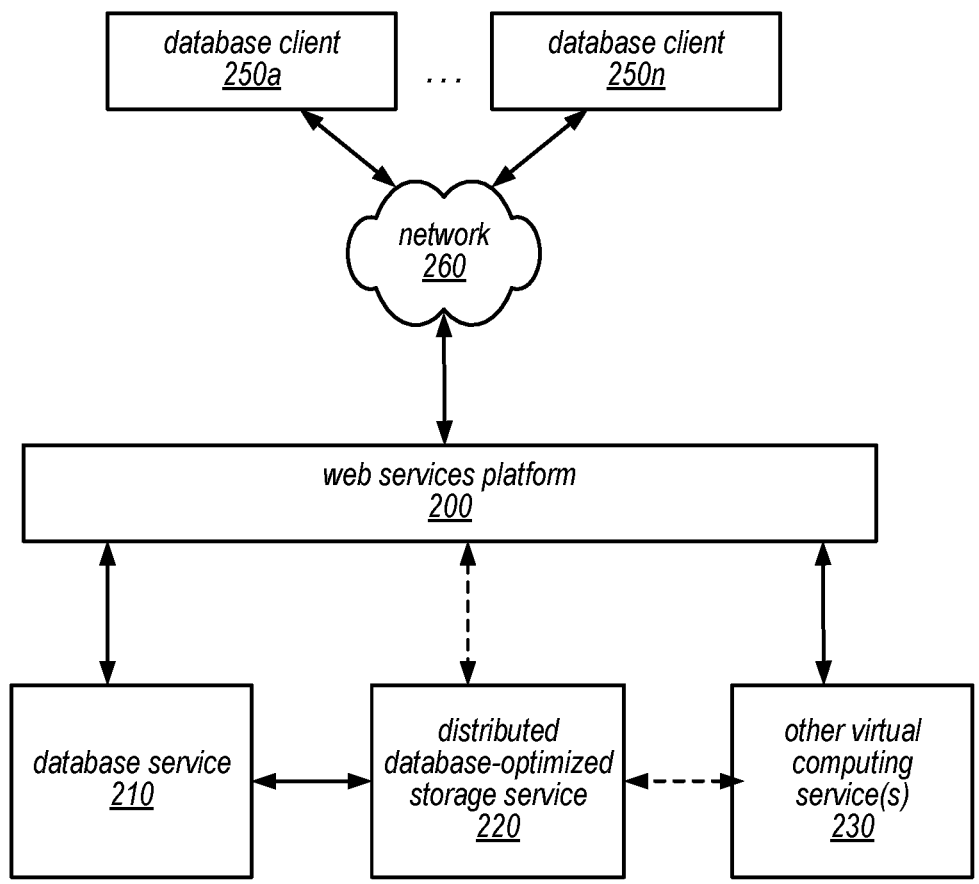
FIG. 2 is a block diagram illustrating a service system architecture that may be configured to implement a web services-based database service configured to perform transaction ordering, according to some embodiments.

One embodiment of a service system architecture that may be configured to implement a web services-based database service is illustrated in FIG. 2. In the illustrated embodiment, a number of clients (shown as database clients 250a-250n) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a transaction request, a read request, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests (e.g., a transaction request, read request, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may, in some embodiments, be configured to distribute a client web services request to a particular database engine head node of its respective database instance. As a simple example, at a time 1, platform 200 may distribute a read request to database engine head node 1 and at a time 3, platform may distribute a write request to database engine head node 2. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
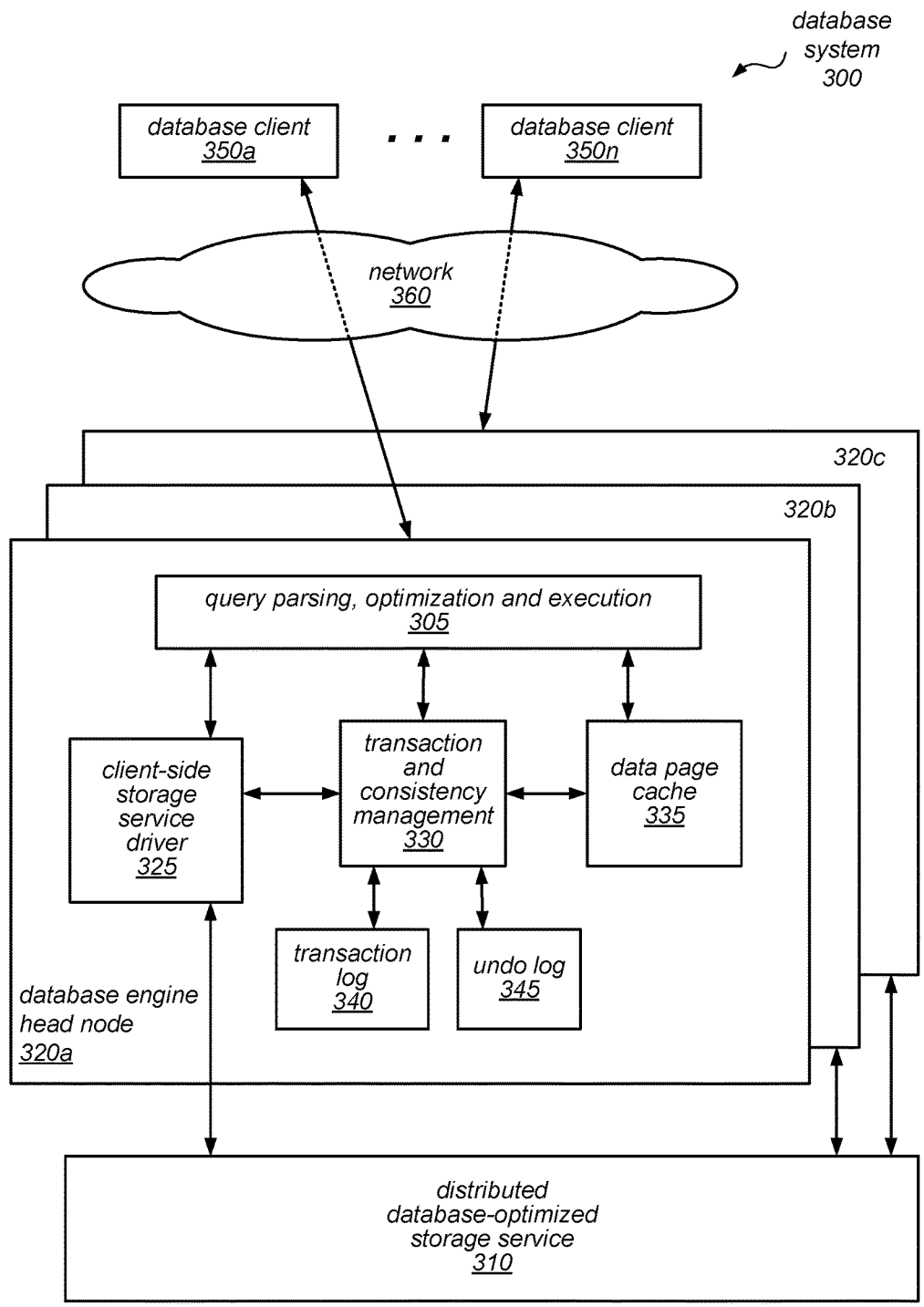
FIG. 3 is a block diagram illustrating various components of a database system configured to perform transaction ordering, according to one embodiment.

FIG. 3 is a block diagram illustrating various components of a database system that includes a database engine and a separate distributed database storage service, according to one embodiment. In this example, database system 300 includes a respective database engine head node 320 for each of several database tables and a distributed database-optimized storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed database-optimized storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a transaction request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records (e.g., from writes) to various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. For example, a database engine head node of the database service may receive a read request to perform a read of a record stored by the database service. Another database engine head node may receive a transaction request to perform a transaction (e.g., write, etc.) to the record. Transaction and consistency management component 330 of the database engine head node that received the read request may then detect a potential read anomaly (e.g., fuzzy read, read skew, etc.) based on a determination that an indication of time associated with the read is within a threshold value of a second indication of time associated with the transaction. In response to detecting the potential read anomaly, the read may be performed after the transaction specified by the transaction request, regardless of whether the first indication of time is indicative of an earlier point in time than the second indication of time. In some instances, the read may be retried such that a potential read anomaly does not occur for the retry.

As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries and/or other transactions received by one or more of database clients 350a-350n and directed to the respective database instances of which it is a component. For example, the disclosed transaction ordering techniques may be implemented in a scenario in which two different database engine head nodes are accessing (e.g., one reading, one writing) the same data within a threshold amount of time, as described herein.

Figure 4:
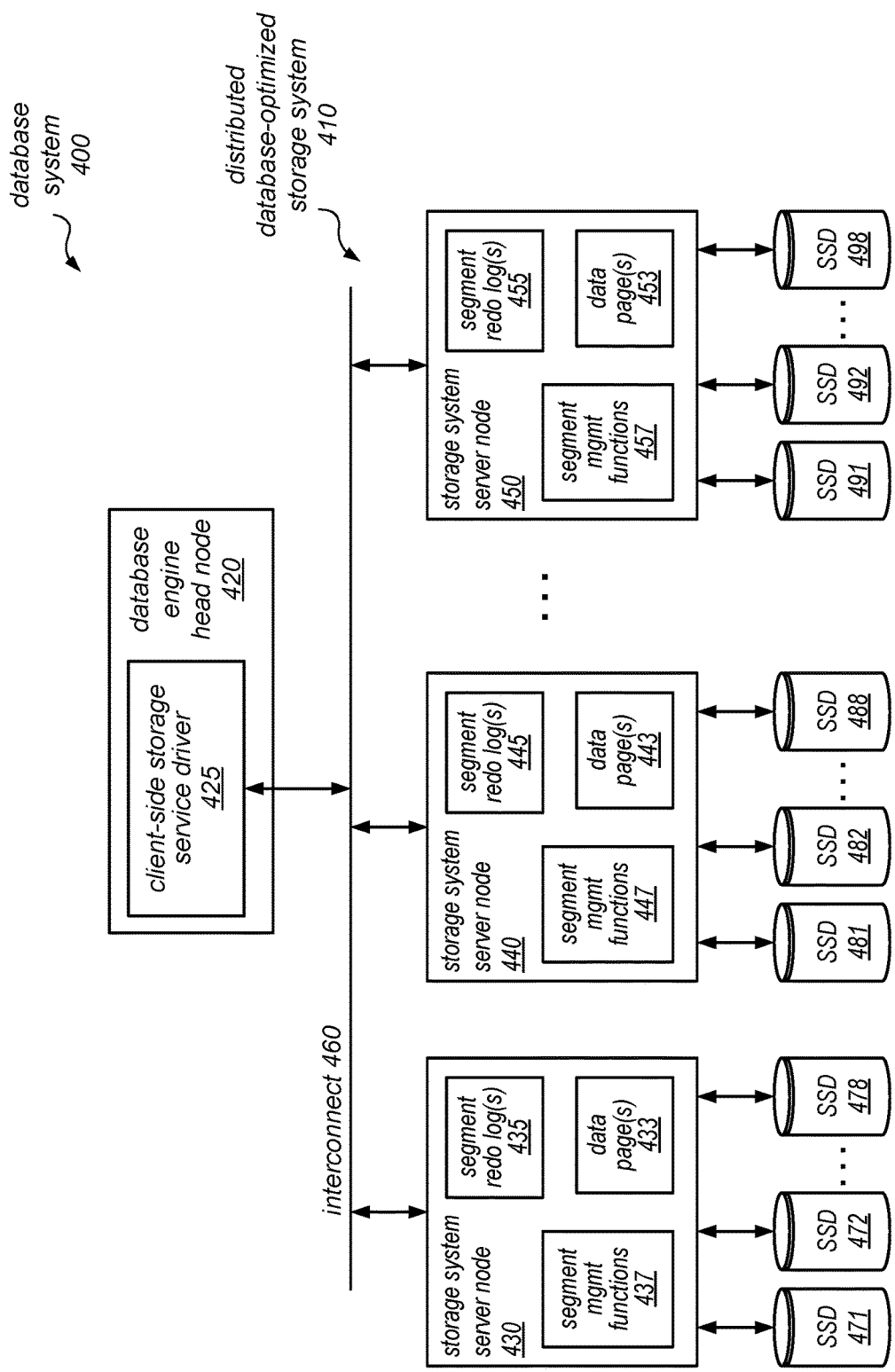
FIG. 4 is a block diagram illustrating a distributed database-optimized storage system configured to perform transaction ordering, according to one embodiment.

One embodiment of a distributed database-optimized storage system is illustrated by the block diagram in FIG. 4. In this example, a database system 400 includes a distributed database-optimized storage system 410, which communicates with a database engine head node 420 over interconnect 460. As in the example illustrated in FIG. 3, database engine head node 420 may include a client-side storage service driver 425. In this example, distributed database-optimized storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed database-optimized storage system may implement a set of processes running on the node server's operating system that manage communication with the database engine head node, e.g., to receive redo logs, send back data pages, etc. In some embodiments, all data blocks written to the distributed database-optimized storage system may be backed up to long-term and/or archival storage (e.g., in a remote key-value durable backup storage system).

Figure 5:
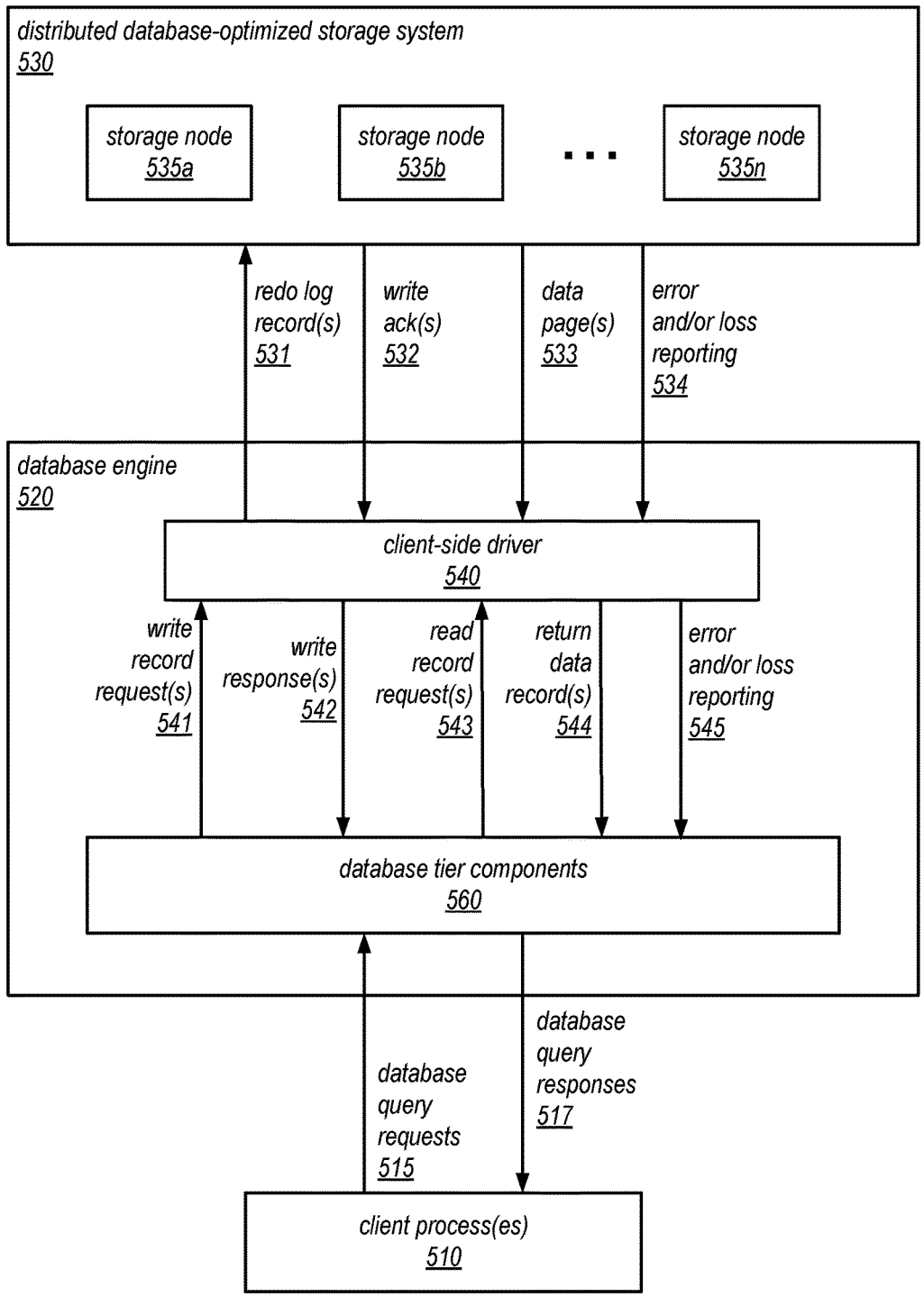
FIG. 5 is a block diagram illustrating the use of a separate distributed database-optimized storage system in a database system configured to perform transaction ordering, according to one embodiment.

FIG. 5 is a block diagram illustrating the use of a separate distributed database-optimized storage system in a database system, according to one embodiment. In this example, one or more client processes 510 may store data to one or more database tables maintained by a database system that includes a database engine 520 and a distributed database-optimized storage system 530. In the example illustrated in FIG. 5, database engine 520 includes database tier components 560 and client-side driver 540 (which serves as the interface between distributed database-optimized storage system 530 and database tier components 560). In some embodiments, database tier components 560 may perform functions such as those performed by query parsing, optimization and execution component 305 and transaction and consistency management component 330 (e.g., transaction ordering) of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write and/or other transaction requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed database-optimized storage system 530. In this example, client-side driver 540 may generate one or more redo log records 531 corresponding to each write record request 541, and may send them to specific ones of the storage nodes 535 of distributed database-optimized storage system 530. Distributed database-optimized storage system 530 may return a corresponding write acknowledgement 532 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed database-optimized storage system 530. In this example, client-side driver 540 may send these requests to specific ones of the storage nodes 535 of distributed database-optimized storage system 530, and distributed database-optimized storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed database-optimized storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed database-optimized storage system 530 and the APIs 541-545 of client-side driver 540 may expose the functionality of the distributed database-optimized storage system 530 to database engine 520 as if database engine 520 were a client of distributed database-optimized storage system 530. For example, database engine 520 (through client-side driver 540) may write redo log records or request data pages through these APIs to perform (or facilitate the performance of) various operations of the database system implemented by the combination of database engine 520 and distributed database-optimized storage system 530 (e.g., storage, access, change logging, recovery, and/or space management operations). As illustrated in FIG. 5, distributed database-optimized storage system 530 may store data blocks on storage nodes 535a-535n, each of which may have multiple attached SSDs. In some embodiments, distributed database-optimized storage system 530 may provide high durability for stored data block through the application of various types of redundancy schemes.

Note that in various embodiments, the API calls and responses between database engine 520 and distributed database-optimized storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database engine 520 and/or distributed database-optimized storage system 530.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database table (e.g., to update a single data block by adding a record to that data block), one or more components of the database engine head node may perform query parsing, optimization, and execution, and may send each portion of the query to a transaction and consistency management component.

The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record, the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. Moreover, in various embodiments, the transaction and consistency management component may be configured to perform transaction ordering. For example, the transaction and consistency management component may be configured to detect a potential read anomaly (e.g., a fuzzy read, read skew, etc.) in a situation where multiple database engine head nodes attempt to perform transactions (e.g., a read and commit) at approximately the same time (e.g., with consistency points within a threshold value of each other). In response to detection of the potential read anomaly, the transaction and consistency management component may be further configured to cause the read to occur after the other transaction even where the read is associated with an earlier time.

Figure 6:
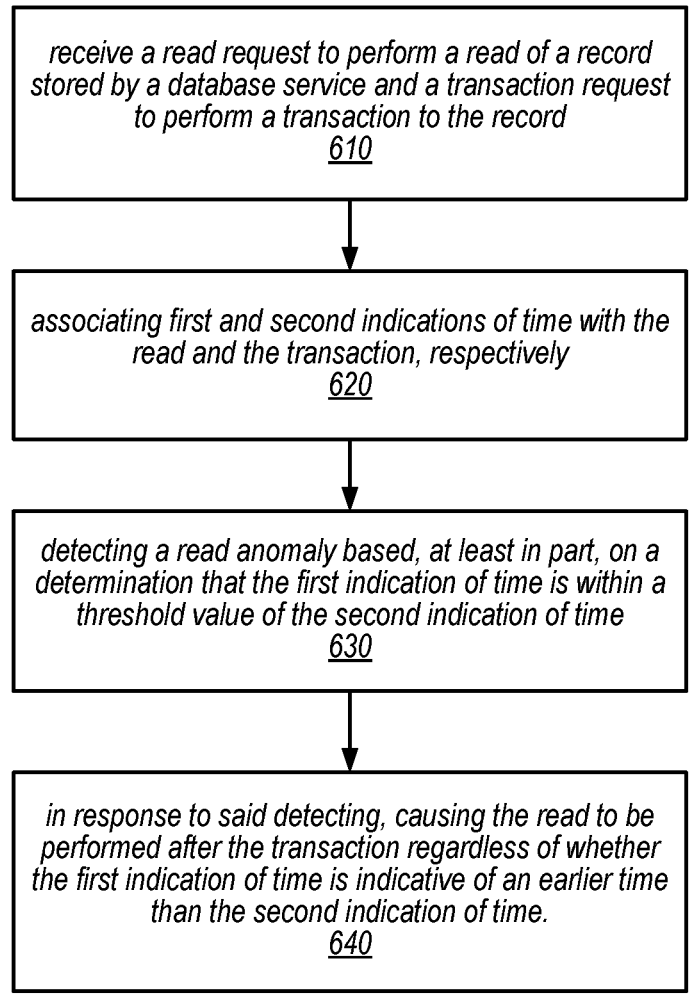
FIG. 6 is a flow diagram illustrating one embodiment of a method for transaction ordering.

Turning now to FIG. 6, in various embodiments, database system 300 (or some system other than a database service that is usable to read, write, and store data) may be configured to perform transaction ordering. While the method of FIG. 6 may be described as being performed by various components (e.g., nodes) of a distributed database system, such as transaction and consistency management 330 and/or a client side driver of database engine head nodes 320a, 320b, 320c, etc., the method need not be performed by any specific component in some cases. For instance, in some cases, the method of FIG. 6 may be performed by some other component or computer system, according to some embodiments. Or, in some cases, components of database system 300 may be combined or exist in a different manner than that shown in the example of FIG. 3. In various embodiments, the method of FIG. 6 may be performed by one or more nodes of a distributed database system, one of which is shown as the computer system of FIG. 8. The method of FIG. 6 is shown as one example implementation of a method for transaction ordering. In other implementations, the method of FIG. 6 may include additional or fewer blocks than are shown.

At 610, a read request to perform a read of a record (e.g., stored by the database service or some other service) and a transaction request to perform a transaction to the record may be received, for example, from one or more clients (e.g., of the database service or other service). In one embodiment, the read request may be received as a SELECT statement or some other request. The read request may also be referred to as a request for a snapshot point in time that is usable to view a snapshot of the record. The transaction request may be an UPDATE, INSERT, or some other transaction (e.g., write transaction) usable to modify a record (e.g., of the database) and that may be committed. In various embodiments, the transaction request and read request may be received by different nodes (e.g., primary nodes that have the ability to read/write and/or a primary node and a read replica that only has the ability, at that time, to read a record) that may have simultaneous access to the records being stored. For example, in one embodiment, web services platform 200 of FIG. 2 may receive the read request and the transaction request and route them to different nodes of different database instances. Note that although the example above at FIGS. 1-5 described separate database and storage tiers, in other examples, the storage tier may not be separate from a database instance. And, in other examples, the system may not be a database service but may instead be another system that is capable of performing reads and writes of stored data. Further note that two nodes that are writers may have locking between them. A node that is a reader and a node that is a writer may not have locking between them, however, to permit concurrency.

In one embodiment, the various nodes may maintain per-node clocks that may be used for transaction ordering. The clocks may be synchronized across the nodes and may have an accuracy of $+/-\delta$ within each other. Because the clocks may have non-zero accuracy in a multi-node system, approximately simultaneous events can occur and may be difficult to accurately order (causality) and may be difficult to preserve a particular isolation level. For example, a read consistent isolation level may include the following properties: at the start time of a statement, there is a point in time at which anything committed from another node is seen at that point in time, changes from another node that have not been committed are not seen at that point in time, and changes from the node itself can be seen whether committed or not. Given two times, A and B, the following three scenarios may occur: A<B (A happened before B); A>B: A happened after B; and A≈B (A happened approximately simultaneously with B, such that A and B are within the accuracy window of $\delta$).

In some embodiments, the times kept by the clocks may be a timestamp (e.g., year 2012, day 15, 20:00.35 GMT), and in other embodiments, the times may be a monotonically increasing value indicative of time, such as a log sequence number ("LSN"). The value may increase upon occurrence of a communication across nodes of the system. In the LSN example, because the values are monotonically increasing, LSN 100 may be indicative of an earlier point in time than an LSN 105. Note that in the LSN time space, each numerical value need not be used. Thus, LSNs 100 and 105 may be the two closest assigned LSNs in one example. In another example, each of LSNs 100-105 may be used.

As shown at 620, first and second indications of time may be associated with the read and the transaction, respectively. For example, in some embodiments, upon receiving a request (e.g., transaction, read, etc.), the node receiving the request may assign one or more times to the transaction based on that head node's respective clock. For example, a head node may receive a read request at LSN 100 and may assign a consistency point in time (snapshot time) Ts of 100. Ts may represent when the snapshot time was created. As another example, a head node (e.g., a different head node) may receive a request to update a table at LSN 101. That node may update the table at LSN 102, and then commit the update at LSN 103. In such an example, the node may assign a commit time Tc of 103 that represents when the transaction was committed. Note that other times associated with the transaction may also be assigned. For example, Tw may be another time, in addition to Tc, which may be associated with a write. Tw may represent the time immediately after the last page to be modified was unlatched (e.g., release/unlock the page) and may be assigned by the head node that received the transaction request. As another example, Tr may be another time, in addition to Ts, which is associated with a read. Tr may represent the time immediately after the first data page read was latched and may be assigned by the head node that received the read request.

As illustrated at 630, a potential read anomaly may be detected. In one embodiment, the head node that received the read request (and executes the read) may perform the detection at block 630. In some embodiments, such detection may be based on a determination that the first indication of time (e.g., Ts and/or Tr) is within a threshold value (e.g., the accuracy window δ) of the second indication of time (e.g., Tc and/or Tw). Various potential read anomalies may occur. For example, a fuzzy read can happen when an update and (re)read happen nearly simultaneously and result in different values read for the same record. In the example of Table 1 using a δ of 5, the read works properly as it reads the proper value by treating the commit as having happened before the read's consistency point. The example of Table 1 is graphically illustrated in FIG. 7A.

TABLE 1

| Node 1 | | Node 2 | |
| --- | --- | --- | --- |
| 101 | Begin Transaction | 100 | Create snapshot ($T_s$ = 100) |
| 102 | Update X = 10 | 101 | |
| 103 | Commit ($T_c$ = 103) | 102 | |
| 104 | | 103 | Read X (10) [100 ≈ 103] |

A fuzzy read is shown in the example of Table 2 and illustrated in FIG. 7B, also using a δ of 5. In the fuzzy read, the read transaction reads a value (1) at LSN 101 and then sees a different value (10) on a second read at LSN 104 of the same record. As described herein, the disclosed techniques may detect the potential fuzzy read of Table 2 and adjust the read so that the fuzzy read may not actually occur.

TABLE 2

| Node 1 | | Node 2 | |
| --- | --- | --- | --- |
| 101 | Begin Transaction | 100 | Create snapshot ($T_s$ = 100) |
| 102 | | 101 | Read X (1) |
| 103 | Update X = 10 | 102 | |
| 104 | Commit ($T_c$ = 104) | 103 | |
| 105 | | 104 | Read X (10) [100 ≈ 104] |

Note that the fuzzy read of Table 2 may not occur if the operations are serialized (e.g., on the client(s)) because the updates will be made before the row is read for the first time.

Another anomalous read is a read skew, which is a situation where inconsistent data (e.g., of multiple different records) is read. Consider the example of Table 3 (illustrated at FIG. 7C), also with δ of 5. In the example of Table 3 and FIG. 7C, the data table has the invariant that X=2Y with initial values of X=1 and Y=2. As shown, the initial value of 1 is read for X at LSN 101 but the updated value for Y is read at LSN 104 as 20, which is inconsistent with X=2Y.

TABLE 3

| Node 1 | | Node 2 | |
| --- | --- | --- | --- |
| 101 | Begin Transaction | 100 | Create snapshot ($T_s$ = 100) |
| 1 02 | Update Y = 20 | 101 | Read X (1) |
| 103 | Update X = 10 | 102 | |
| 104 | Commit ($T_c$ = 104) | 103 | |
| 105 | | 104 | Read Y (20) [100 ≈ 104] |

In some embodiments, a potential read anomaly may be detected where a commit time Tc is within the accuracy window (δ) of the consistency point of the read Ts. A potential read anomaly is used herein to indicate that a possibility exists that a read anomaly may occur but note that a potential read anomaly does not necessarily mean that a read anomaly will definitely occur. Accordingly, if a possibility of a read anomaly exists, the system may detect it and attempt to avoid the potential read anomaly, as described below at block 640.

As noted above, in some embodiments, times other than Tc and Ts may likewise be associated with a read and/or other transaction. For example, in an embodiment using Tw, if Tc>Ts, then the modifications made by the transaction are not seen by the read and an anomalous read may not occur. If Tc<Ts, then the modifications made by the transaction are seen by the read. If Tc≈Ts and Tw<Ts, then the modifications made by the transaction were made before the read so there is not a potential read anomaly. Changes made by the transaction are seen by the read. Otherwise, if Tc≈Ts and Tw≈Ts, a potential read anomaly exists.

In some embodiments, Tr may also be used for detecting a potential read anomaly. In such embodiments, if Tc>Ts, then the modifications made by the transaction are not seen by the read and an anomalous read may not occur. If Tc<Ts, then the modifications made by the transaction are seen by the read. If Tc≈Ts and Tw<Tr, then the modifications made by the transaction were made before the read so there is not a potential read anomaly. Otherwise, if Tc≈Ts and Tw≈Tr, a potential read anomaly exists and may be detected at block 630.

Note that, in some embodiments, read skew and fuzzy reads may only happen after the first page latch. Accordingly, statements that retrieve single records may not encounter such anomalies. Thus, in some embodiments, the detection logic of block 630 may only be performed for multiple record retrievals (whether multiple retrievals of the same record or retrievals of multiple different records).

As shown at 640, in response to said detecting the potential read anomaly, the node that received the read request may cause the read, specified by the read request, to be performed after the transaction specified by the transaction request, regardless of whether the first indication of time is indicative of an earlier point in time than the second indication of time.

In some embodiments, causing the read to be performed after the transaction may include the node that received the read request retrying the read such that a retry indication of time associated with retrying the read is indicative of a time later than the first indication of time. For example, if a potentially fuzzy read or read skew is detected, the read statement may be retried by preserving Ts but resetting Tr (e.g., pushing Tr forward in time). By maintaining Ts on retry, forward progress may be achieved because, as Tr is advanced, the transaction and read may eventually fall into one of the known cases of the comparison logic (e.g., a situation in which a potential read anomaly will not occur).

Note that, in one embodiment, for the retry, the detection logic of block 630 may be applied again with the retry time (updated Tr) replacing the previous Tr. Accordingly, if the retry is successful, the detection logic will determine that no read anomaly occurred for the retried read. For example, using the updated Tr may cause the detection logic to determine that the retry falls within one of the categories in which the anomalous read is not possible (e.g., Tc≈Ts and Tw<Tr) and retry will take place without an anomalous read. On the other hand, another potential anomalous read may take place such that upon another retry, another retry time will be pushed further forward in time. Application of the detection logic, the determination that a potentially anomalous read exists, and retry of the statement may occur any number of times until a retry is successful. Or, in some embodiments, the node may retry the statement a certain maximum number of times (e.g., 2, 3, 10, etc.) before returning an error message with the actual read value with the error message indicating that the read may not be accurate.

In one embodiment, the threshold value may be modified. For example, based on the frequency of retry for transactions that have already occurred in the system, the threshold value may be modified. As an example, if retries are occurring frequently, then the threshold value may be reduced to a less conservative level. Similarly, the threshold value may be increased.

In some embodiments, blocks 620, 630, and 640 may occur for read request that include multiple record retrievals, whether multiple reads of the same record or reads of multiple different records. Thus, in such embodiments, the check for a read anomaly may take place for multiple record retrievals but not for single record retrieval. Accordingly, the first read may be a free read because a read skew or fuzzy read may not be possible if only a single read is being performed (as the definitions of those read anomalies include a second read that is inconsistent with the first read). Therefore, in some embodiments, the system may not always apply the method of FIG. 6 when handing a read request for a single record retrieval and a transaction request that are within the accuracy window (threshold value) of each other.

In some embodiments, the node that received the read request may be aware that another node received a write request and is updating the record. For example, the system may include an underlying substructure that ensures other nodes will be aware of a change to the data. Example underlying substructures include cache fusion (e.g., at the web services platform 200 level relative to respective data page caches 335 or some other caches) or shared disks. In one embodiment, a coherent cache may sit on top of the common storage (e.g., the storage tier). The coherent cache may ensure that if a node wrote something, another node will see it. In one embodiment, various indications of time may be stored in a transaction table. For example, Tw may be stored with a transaction commit time as of the time of commit and each time a value is written, a transaction identifier may be generated. The transaction identifier may indicate whether a given transaction is active or committed. If the transaction is active for a given record, a node performing a read of that record may generate a previous value (e.g., roll back, undo, etc.) for that record.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the services/systems and/or storage services/systems described herein).

The disclosed transaction ordering techniques may provide for a strong and understandable isolation level to customers. The techniques may improve scalability of the system because snapshot (read) creation may be fast and not require any network communication. Moreover, workloads where transactions do not overlap can also scale out well. Singleton row retrieval may be fast as those reads may be free without having to perform the read anomaly detection logic. In embodiments using a refined accuracy window (e.g., by factoring in Tr and/or Tw in addition to Tc and Ts), the likelihood of statement retries may be decreased.

Figure 8:
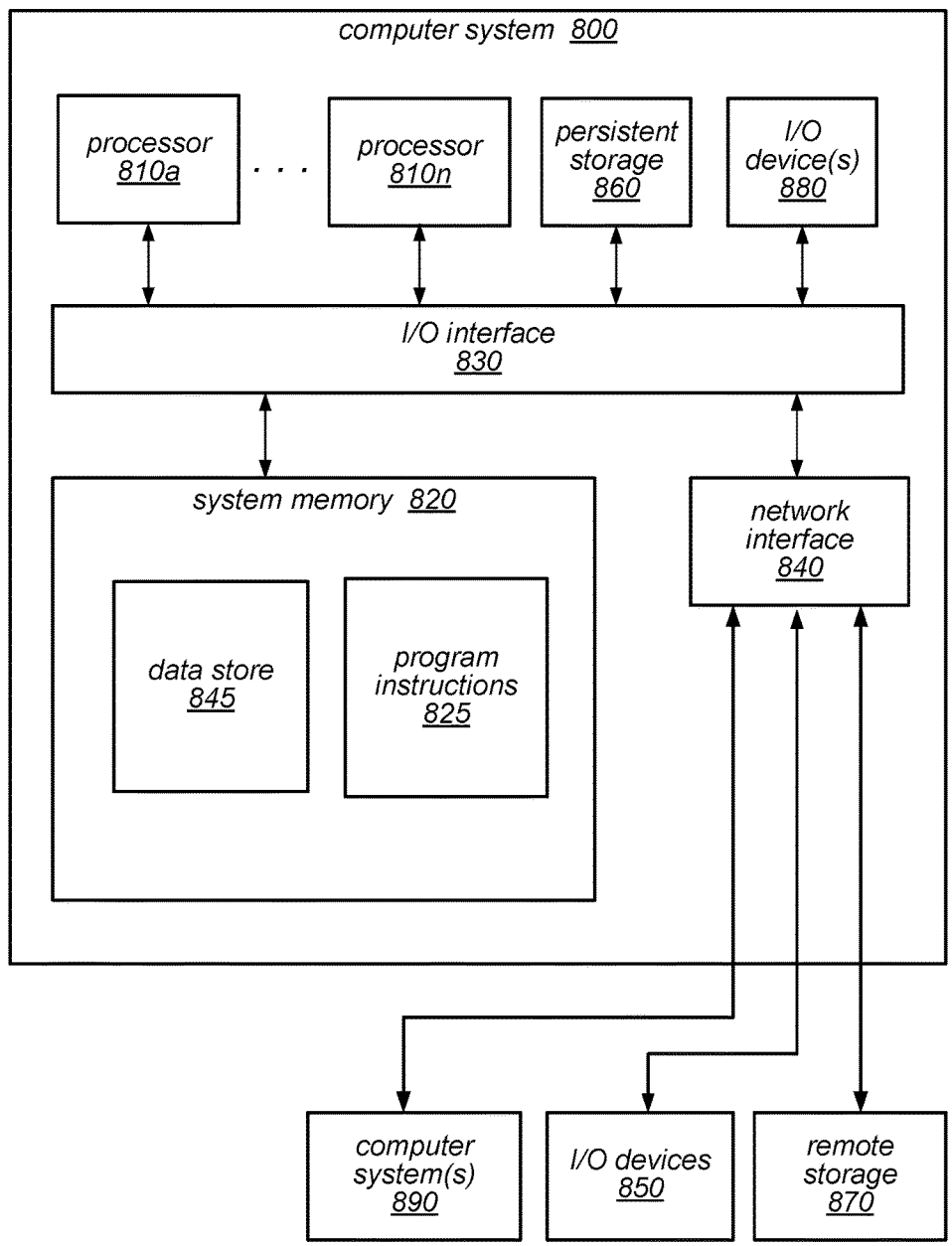
FIG. 8 is a block diagram illustrating a computer system configured to implement transaction ordering, according to various embodiments.

FIG. 8 is a block diagram illustrating a computer system configured to implement at least a portion of the systems described herein, according to various embodiments. For example, computer system 800 may be configured to implement a node of a (e.g., of a database tier or comparable system), or one of a plurality of storage nodes that stores records and associated metadata on behalf of clients, in different embodiments. Computer system 800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 800 includes one or more processors 810 (any of which may include multiple cores, which may be single or multi-threaded) coupled to a system memory 820 via an input/output (I/O) interface 830. Computer system 800 further includes a network interface 840 coupled to I/O interface 830. In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. The computer system 800 also includes one or more network communication devices (e.g., network interface 840) for communicating with other systems and/or components over a communications network (e.g. Internet, LAN, etc.). For example, a client application executing on system 800 may use network interface 840 to communicate with a server application executing on a single server or on a cluster of servers that implement one or more of the components of the database systems described herein. In another example, an instance of a server application executing on computer system 800 may use network interface 840 to communicate with other instances of the server application (or another server application) that may be implemented on other computer systems (e.g., computer systems 890).

In the illustrated embodiment, computer system 800 also includes one or more persistent storage devices 860 and/or one or more I/O devices 880. In various embodiments, persistent storage devices 860 may correspond to disk drives, tape drives, solid state memory, other mass storage devices, or any other persistent storage device. Computer system 800 (or a distributed application or operating system operating thereon) may store instructions and/or data in persistent storage devices 860, as desired, and may retrieve the stored instruction and/or data as needed. For example, in some embodiments, computer system 800 may host a storage system server node, and persistent storage 860 may include the SSDs attached to that server node.

Computer system 800 includes one or more system memories 820 that are configured to store instructions and data accessible by processor(s) 810. In various embodiments, system memories 820 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein. In various embodiments, program instructions 825 may be encoded in platform native binary, any interpreted language such as Java™ byte-code, or in any other language such as C/C++, Java™, etc., or in any combination thereof. For example, in the illustrated embodiment, program instructions 825 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 825 may implement multiple separate clients, server nodes, and/or other components.

In some embodiments, program instructions 825 may include instructions executable to implement an operating system (not shown), which may be any of various operating systems, such as UNIX, LINUX, Solaris™, MacOS™, Windows™, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In some embodiments, system memory 820 may include data store 845, which may be configured as described herein. For example, the information described herein as being stored by the database tier (e.g., on a database engine head node), such as a transaction log, an undo log, cached page data, or other information used in performing the functions of the database tiers described herein may be stored in data store 845 or in another portion of system memory 820 on one or more nodes, in persistent storage 860, and/or on one or more remote storage devices 870, at different times and in various embodiments. Similarly, the information described herein as being stored by the storage tier (e.g., redo log records, coalesced data pages, and/or other information used in performing the functions of the distributed storage systems described herein) may be stored in data store 845 or in another portion of system memory 820 on one or more nodes, in persistent storage 860, and/or on one or more remote storage devices 870, at different times and in various embodiments. In general, system memory 820 (e.g., data store 845 within system memory 820), persistent storage 860, and/or remote storage 870 may store data blocks, replicas of data blocks, metadata associated with data blocks and/or their state, database configuration information, and/or any other information usable in implementing the methods and techniques described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as other computer systems 890 (which may implement one or more storage system server nodes, database engine head nodes, and/or clients of the database systems described herein), for example. In addition, network interface 840 may be configured to allow communication between computer system 800 and various I/O devices 850 and/or remote storage 870. Input/output devices 850 may, in some embodiments, include one or more display terminals, keyboards, keypads, touchpads, scanning devices, voice or optical recognition devices, or any other devices suitable for entering or retrieving data by one or more computer systems 800. Multiple input/output devices 850 may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computer system 800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
a memory to store program instructions which, if performed by at least one processor, cause the at least one processor to perform a method to at least:
receive, at a web-based service, a first request to read an item of a database hosted by the web-based service;
receive, at the web-based service, a second request to update the item of the database after receiving the first request to read the item; and
responsive to a potential read anomaly detected based in part on determining that a difference in time between receiving the first request and a commitment of the update of the second request to the database is within a threshold, provide, by the web-based service, the update to the item as a response to the first request to read the item, wherein the potential read anomaly includes a fuzzy read or a read skew.

2. The system of claim 1, wherein the program instructions cause the at least one processor to further perform the method to:
modify, by the web-based service, the threshold;
receive, at the web-based service, a third request to read a second item of the database;
receive, at the web-based service, a fourth request to update the second item of the database after receiving the third request to read the second item; and
provide, by the web-based service, the update to the second item in response to the third request to read the second item, wherein to provide the update to the second item in response to the third request to read the second item, the program instructions cause the at least one processor to perform the method to:
determine that a difference in time between receiving the third request and the fourth request is within the modified threshold.

3. The system of claim 1, wherein the program instructions cause the at least one processor to further perform the method to:
receive, at the web-based service, a third request to read a second item of the database;
receive, at the web-based service, a fourth request to update the second item of the database after receiving the third request to read the second item; and
provide, by the web-based service, the second item without the update in response to the third request to read the second item, wherein to provide the second item without the update in response to the third request to read the second item, the program instructions cause the at least one processor to perform the method to:
determine that a difference in time between receiving the third request and the fourth request exceeds the threshold.

4. The system of claim 1, wherein to provide the update to the item in response to the first request to read the item, the program instructions cause the at least one processor to perform the method to perform a retry of the first request to read the item of the database, wherein the retry is performed after the update to the item is performed.

5. The system of claim 1, wherein the web-based service comprises a plurality of nodes that provide access to the database stored in a distributed data store separate from the plurality of nodes, wherein the first request is received at a first one of the nodes, wherein the second request is received at a second node of the nodes, and wherein the first node provides the update to the item of the database further in response to identifying the update to the item in the distributed data store.

6. The system of claim 1, wherein the memory further stores program instructions which, if performed by the at least one processor, cause the at least one processor to perform the method to change a time associated with the first request to read the item in order to prevent detection of the potential read anomaly.

7. A method, comprising:
receiving, at a web-based service, a first request to read an item of a database hosted by the web-based service;
receiving, at the web-based service, a second request to update the item of the database after receiving the first request to read the item; and
responsive to a potential read anomaly detected based in part on determining that a difference in time between receiving the first request and a commitment of the update of the second request to the database is within a threshold, providing, by the web-based service, the update to the item as a response to the first request to read the item, wherein the potential read anomaly includes a fuzzy read or a read skew.

8. The method of claim 7, further comprising:
modifying, by the web-based service, the threshold;
receiving, at the web-based service, a third request to read a second item of the database;
receiving, at the web-based service, a fourth request to update the second item of the database after receiving the third request to read the second item; and
providing, by the web-based service, the update to the second item in response to the third request to read the second item, comprising:
determining that a difference in time between receiving the third request and the fourth request is within the modified threshold.

9. The method of claim 7, further comprising:
receiving, at the web-based service, a third request to read a second item of the database;
receiving, at the web-based service, a fourth request to update the second item of the database after receiving the third request to read the second item; and
providing, by the web-based service, the second item without the update in response to the third request to read the second item, comprising:
determining that a difference in time between receiving the third request and the fourth request exceeds the threshold.

10. The method of claim 7, wherein providing the update to the item in response to the first request to read the item comprises performing a retry of the first request to read the item of the database, wherein the retry is performed after the update to the item is performed.

11. The method of claim 7, wherein the web-based service comprises a plurality of nodes that provide access to the database stored in a distributed data store separate from the plurality of nodes, wherein the first request is received at a first one of the nodes, wherein the second request is received at a second node of the nodes, and wherein the first node provides the update to the item of the database further in response to identifying the update to the item in the distributed data store.

12. The method of claim 7, further comprises changing a time associated with the first request to read the item in order to prevent detection of the potential read anomaly.

13. A non-transitory, computer-readable storage medium, storing program instructions that when executed by one or more computing devices cause the one or more computing devices to implement:
receiving, at a web-based service, a first request to read an item of a database hosted by the web-based service;
receiving, at the web-based service, a second request to update the item of the database after receiving the first request to read the item; and
responsive to a potential read anomaly detected based in part on determining that a difference in time between receiving the first request and a commitment of the update of the second request to the database is within a threshold, providing, by the web-based service, the update to the item as a response to the first request to read the item, wherein the potential read anomaly includes a fuzzy read or a read skew.

14. The non-transitory, computer-readable storage medium of claim 13, wherein the program instructions cause the one or more computing devices to further implement:
modifying, by the web-based service, the threshold;
receiving, at the web-based service, a third request to read a second item of the database;
receiving, at the web-based service, a fourth request to update the second item of the database after receiving the third request to read the second item; and
providing, by the web-based service, the update to the second item in response to the third request to read the second item, wherein, in providing the update to the item in response to the first request to read the item, the program instructions cause the one or more computing devices to implement:
determining that a difference in time between receiving the third request and the fourth request is within the modified threshold.

15. The non-transitory, computer-readable storage medium of claim 13, wherein the program instructions cause the one or more computing devices to further implement:
receiving, at the web-based service, a third request to read a second item of the database;
receiving, at the web-based service, a fourth request to update the second item of the database after receiving the third request to read the second item; and
providing, by the web-based service, the second item without the update in response to the third request to read the second item, wherein, in providing the second item without the update in response to the third request to read the second item, the program instructions cause the one or more computing devices to implement:
determining that a difference in time between receiving the third request and the fourth request exceeds the threshold.

16. The non-transitory, computer-readable storage medium of claim 13, wherein, in providing the update to the item in response to the first request to read the item, the program instructions cause the one or more computing devices to implement performing a retry of the first request to read the item of the database, wherein the retry is performed after the update to the item is performed.

17. The non-transitory, computer-readable storage medium of claim 13, wherein the web-based service comprises a plurality of nodes that provide access to the database stored in a distributed data store separate from the plurality of nodes, wherein the first request is received at a first one of the nodes, wherein the second request is received at a second node of the nodes, and wherein the first node provides the update to the item of the database further in response to identifying the update to the item in the distributed data store.

* * * * *